Jan. 23, 1923.
D. DE LUCA.
ELECTRIC FURNACE.
FILED OCT. 13, 1919.
1,442,925.
3 SHEETS—SHEET 1.
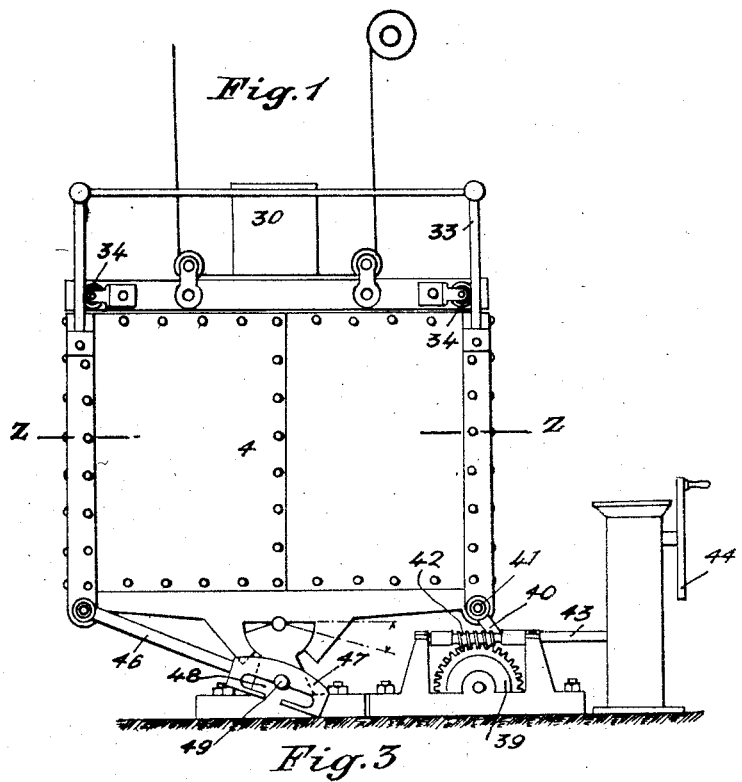
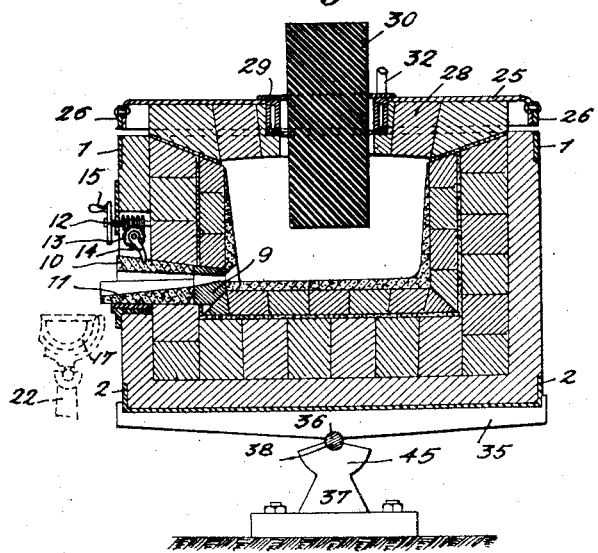
Inventor:
Diego De Luca Jan. 23, 1923.
D. DE LUCA.
ELECTRIC FURNACE.
FILED OCT. 13, 1919.
1,442,925.
3 SHEETS—SHEET 2.
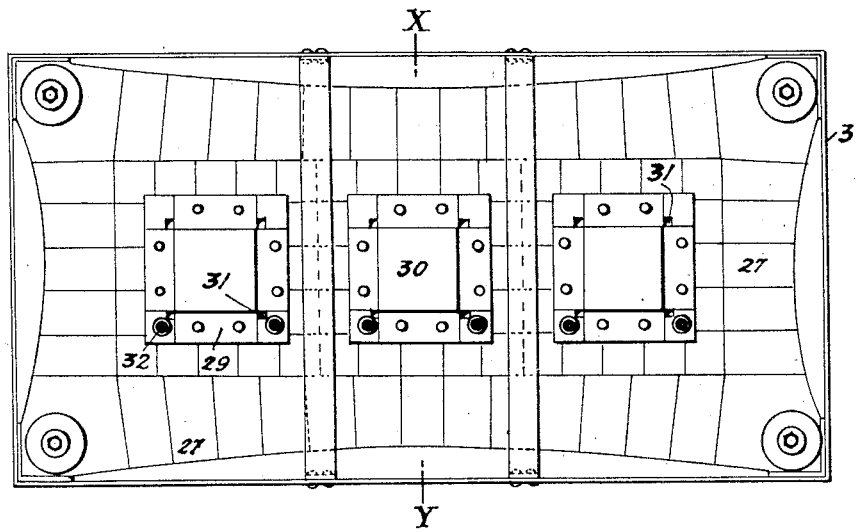
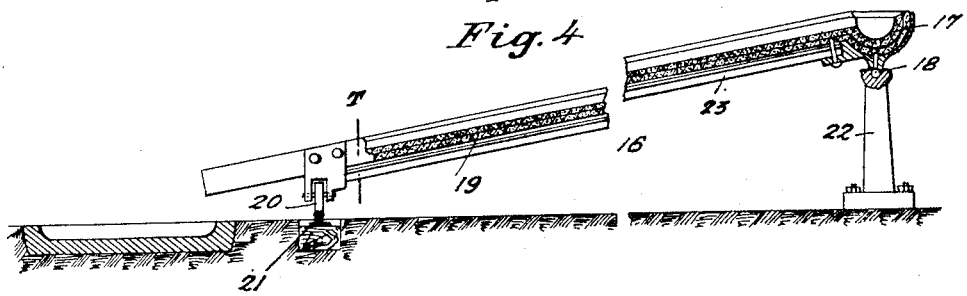
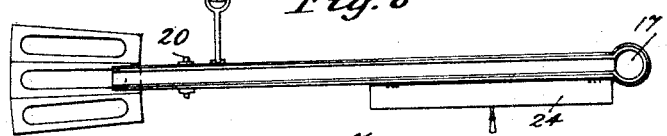
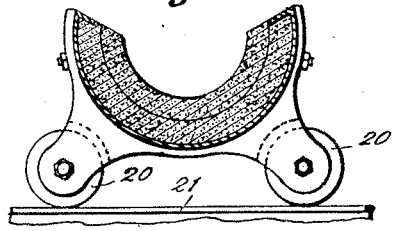
Inventor:
Diego De Luca Jan. 23, 1923. 1,442,925.
D. DE LUCA.
ELECTRIC FURNACE.
FILED OCT. 13, 1919. 3 SHEETS—SHEET 3.

Inventor:
Diego De Luca

Patented Jan. 23, 1923.

1,442,925

UNITED STATES PATENT OFFICE.

DIEGO DE LUCA, OF COTRONE, ITALY.

ELECTRIC FURNACE.

Application filed October 13, 1919. Serial No. 330,408.

*To all whom it may concern:*

Be it known that I, DIEGO DE LUCA, of Cotrone, Italy, have invented certain new and useful Improvements in Electric Furnaces, of which the following is a specification.

My invention relates to an electric furnace and has for its object to produce an electric furnace adapted to be used for making cast iron from scraps of iron and the like, and which can be operated with any kind of electric current.

Figure 5:
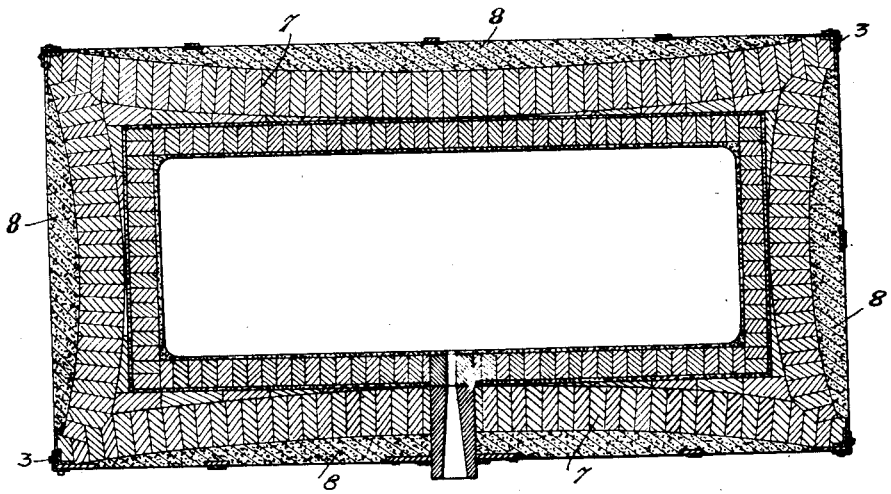
Figure 6:
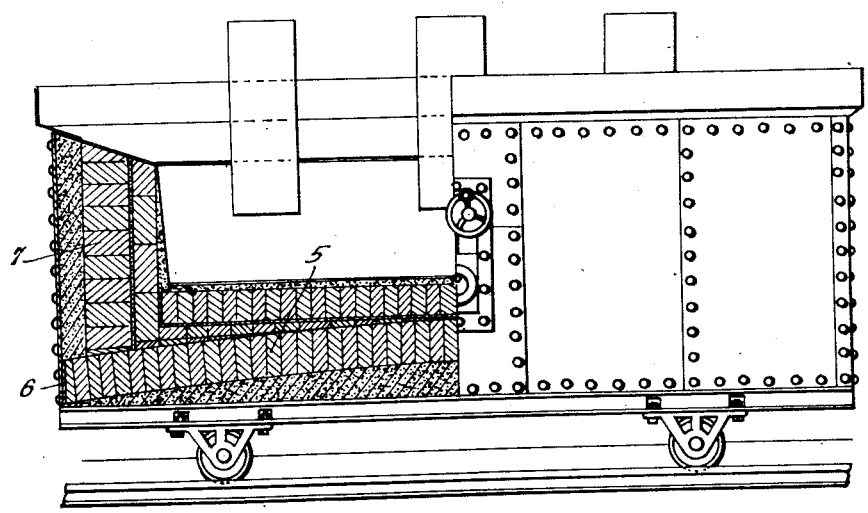

One form of construction of such a furnace will now be described with reference to the accompanying drawings, wherein Fig. 1 is a side view of the furnace and the tilting means, Fig. 2 a plan view; Fig. 3 a section along line X—Y of Fig. 2; Fig. 4 shows the pouring channel; Fig. 5 is a section along line z—z of Fig. 1; Fig. 6 is a side view, partly in section of a furnace mounted on wheels, Fig. 7 a section along line T—T of Fig. 4 and Fig. 8 a plan view of the pouring channel and the ingot moulds, drawn to a smaller scale.

The four-sided furnace comprises a main frame made of two horizontal iron parts, a top part 1 and a bottom part 2 connected with each other by vertical parts. 3 are reinforcing angle irons used for supporting the ends of the arches to be described.

The furnace is externally covered with iron sheets 4 secured to the main frame by screws, bolts or the like.

The interior of the furnace is made of five brick-arches one on each side of the four-sided frame, and the fifth constituting the base of the furnace. This arch construction is clearly shown in Figs. 5 and 6. Fig. 5 shows the four lateral arches and Fig. 6 the base arch. The latter is supported by two heavy angle irons 5 secured to the bottom part 2 of the main frame, whereas the arches forming the side walls are supported by the above mentioned angle irons 3. The arches are made of refractory brick of silicium which expands when subjected to heat, a feature of great importance for maintaining the compact formation of the arches. The bricks are covered with a protecting coating over which is arranged a second layer of refractory bricks which in turn are covered with a protective coating.

The upper portion of the brick-work is slanted to facilitate the charging of the furnace. The space 8 between the outside surface of the arches and the outside plates forming the outer walls of the furnace is filled with asbestos paste to prevent loss of heat as well as to protect the metal parts.

In Fig. 3 is shown the tapping hole which is formed in three portions. The inside part 9 which is in contact with the molten metal is made of electrode carbon, which cannot melt nor to which the slags can stick. The other two portions 10, 11 are of refractory material. The exposed surfaces are coated with a paste of electrode carbon and starch glue. For removing or replacing the said portions, a special means is provided comprising a worm shaft 12 engaged by a worm wheel 13. On shaft 12 is mounted a lever 14 which enters a notch formed in the upper part of portion 10 of the tapping hole. By a rotation of the hand-wheel 15 on shaft 12 in one or the other direction the lever 14 will either push in or pull out the portion 10. After the removal of this portion, the other portions can be readily removed.

Below the tapping hole is placed a pouring channel 16 comprising a cast-iron cup 17 having a pivot pin formed with a spherical head 18, and a channel 19. The end of the latter rests on wheels 20 adapted to run on a track 21. The pivot 18 is seated in the top of an upright 22. The track 21 is curved along the arc of a circle the center of which coincides with the axis of the upright 22. The inner surface of the cup 17 and of the channel 19 is coated with a refractory composition. To prevent any deformation of the channel, it is re-inforced by a brace 23 having its two extremities firmly secured to the cup 17 and carrier 20. A hinged cover 24 adapted to close the channel 19 protects the workmen. The object of the channel is to avoid any displacement of the furnace itself, for filling the ingot moulds which are arranged all along the track 21. For filling the moulds therefore, one has only to move the channel 19 about its pivot 18.

The furnace is closed by a removable cover 25 fitting the open top. This cover is made of an iron part 26 supporting four arches 27 of refractory brick. The central arch 28 bears upon the four arches disposed along the sides of the furnace and has three openings into which are fitted three iron boxes 29. The latter are provided with spaces and means for the circulation of a cooling medium.

Through these boxes 29 pass the electrodes 30, insulated from the boxes by asbestos packings. An opening 31 is left in each box to allow the escape of gases. By means of the pipe stems 32 the pipes for the circulation of the cooling medium (water) are connected. The cover, as shown in Fig. 1, may be raised through suitable devices, such as counterweights. In its vertical movement the cover is guided by vertical rods 33, arranged at the four corners of the furnace, by means of rollers 34 mounted in brackets provided on the four corners of the cover.

Figs. 1 and 3 show the furnace mounted for being oscillated. There are provided three brackets 35 each having a circular notch 36 and each bearing upon a support 37, the shaft 38 forming the pivot. The oscillating movement of the furnace is caused by a hand-wheel 44, which, by means of gears (not shown) rotates the shaft 43. This shaft is provided with a worm 42 engaged by a worm-wheel 39. The shaft of the latter carries a crank connected through a link 40 to one corner 41 of the furnace. By rotating the hand-wheel 44 the furnace may be oscillated to and fro. Obviously, the rotation of the hand-wheel may be effected from any mechanical or electrical source of power. The surfaces 45 of the supports 37 are formed so as to limit the degree of tilt. Furthermore, the oscillation may be limited by a safety device, comprising a link 46, (Fig. 1) connected to a plate 47 having a slot 48. A fixed pivot 49 engages the slot 48. In the center of the slot is a notch into which the pivot 49 enters when the furnace occupies its horizontal position. Of course, the furnace cannot be oscillated from such position, unless the plate 47 is first raised to disengage the pivot 48 from the notch.

The ends of the slot 48 limit the oscillating movement of the furnace, which limitation is produced by the pivot 48 engaged in one or the other end of the slot.

Fig. 6 shows the same furnace mounted upon a truck, running on tracks.

I claim:

1. In an electric furnace the combination with a four-sided metal frame, of five arches, of refractory brick, four of said arches being arranged one on each side of the said frame and the fifth in the base, the said arches bearing respectively upon the four corners of the furnace, and on the end walls, and angle-irons re-inforcing said corners and side walls, and metal sheeting forming the outside walls of the furnace.

2. In an electric furnace, as specified in claim 1, the provision of flat brickwork covering the inner faces of the arches, a coating of protective material between the arches and the said flat brickwork, a protective coating covering the latter, and a heat-insulating material arranged between the arches and the metal sheeting.

3. In an electric furnace, as specified in claim 1 a tapping hole formed of three portions; a non-melting inner portion and two outer portions made of refractory material, and a means for mechanically removing and replacing the said portions.

4. In an electric furnace, as specified in claim 1, a cover comprising four brick arches arranged along the four sides of the cover, and a central arch supported by the said four arches, and means for mounting and retaining the electrodes.

5. An electric furnace, as specified in claim 4, comprising means for the discharge of the gases, and means for cooling the electrode retaining means.

6. An electric furnace as specified in claim 1, comprising means for oscillating the furnace to and fro for the purpose of mixing the molten metal, means for limiting the oscillating movement, and means for retaining the furnace immovably in place.

7. In an electric furnace the combination of a set of brick-arches forming a hearth within the furnace, a removable cover for closing the hearth and adapted to support the electrodes, a tapping hole, a means for tilting the furnace, means for controlling and arresting said tilting movement, and means for raising and guiding the removable cover.

In testimony whereof I have hereunto signed my name in the presence of two witnesses.

DIEGO DE LUCA.

Witnesses:
 ELENA FOSI,
 O. DIRROCOLO.